(12) United States Patent
Cook

(10) Patent No.: US 11,553,645 B2
(45) Date of Patent: Jan. 17, 2023

(54) FLEX ARM AIR BAG LINKAGE

(71) Applicant: CNH Industrial America LLC, New Holland, PA (US)

(72) Inventor: Joel T. Cook, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 380 days.

(21) Appl. No.: 16/646,920

(22) PCT Filed: Sep. 12, 2018

(86) PCT No.: PCT/US2018/050676
§ 371 (c)(1),
(2) Date: Mar. 12, 2020

(87) PCT Pub. No.: WO2019/055521
PCT Pub. Date: Mar. 21, 2019

(65) Prior Publication Data
US 2020/0260640 A1    Aug. 20, 2020

Related U.S. Application Data

(60) Provisional application No. 62/557,356, filed on Sep. 12, 2017.

(51) Int. Cl.
*A01D 34/28*    (2006.01)
*A01B 63/00*    (2006.01)
(Continued)

(52) U.S. Cl.
CPC .......... *A01D 34/283* (2013.01); *A01B 63/008* (2013.01); *A01B 71/02* (2013.01); *A01D 41/141* (2013.01); *A01D 41/145* (2013.01)

(58) Field of Classification Search
CPC .. A01D 34/283; A01D 41/141; A01D 41/145; A01B 63/008; A01B 71/02
See application file for complete search history.

(56) References Cited

U.S. PATENT DOCUMENTS

| | | | | |
|---|---|---|---|---|
| 3,597,907 | A | * | 8/1971 | Neal ..................... A01D 34/246 56/DIG. 15 |
| 3,678,885 | A | * | 7/1972 | Ferguson ................. G01C 9/12 116/DIG. 13 |

(Continued)

FOREIGN PATENT DOCUMENTS

DE    102004031514 B3    11/2005

OTHER PUBLICATIONS

International Search Report and Written Opinion for Application No. PCT/US2018/050676 dated Nov. 15, 2018 (11 pages).

*Primary Examiner* — Mussa A Shaawat
(74) *Attorney, Agent, or Firm* — Peter Zacharias; Patrick Sheldrake

(57) ABSTRACT

A flexible header for an agricultural vehicle including a frame, at least one cutter bar movably coupled to the frame, and an adjustment system coupled to the frame and the at least one cutter bar. The adjustment system is configured to adjust a position of the at least one cutter bar. The adjustment system includes at least one linkage assembly. The linkage assembly includes a first link member and a second link member. Each of the first and second link members are rotationally coupled to the frame. The adjustment system also includes at least one fluid spring coupled to the first link member and the second link member such that the at least one linkage assembly translates a substantially linear movement of the at least one fluid spring to adjust the at least one cutter bar.

20 Claims, 7 Drawing Sheets

(51) Int. Cl.
*A01D 41/14* (2006.01)
*A01B 71/02* (2006.01)

(56) References Cited

U.S. PATENT DOCUMENTS

| | | | | | |
|---|---|---|---|---|---|
| 3,851,451 | A | * | 12/1974 | Agness | A01D 41/141 |
| | | | | | 56/DIG. 15 |
| 3,886,718 | A | * | 6/1975 | Talbot | A01D 41/141 |
| | | | | | 56/208 |
| 3,967,437 | A | * | 7/1976 | Mott | A01D 41/141 |
| | | | | | 116/282 |
| 3,982,383 | A | * | 9/1976 | Mott | A01D 57/26 |
| | | | | | 56/DIG. 15 |
| 4,011,709 | A | * | 3/1977 | Mott | A01D 41/148 |
| | | | | | 56/14.4 |
| 4,091,602 | A | * | 5/1978 | Williams | A01D 41/141 |
| | | | | | 56/11.1 |
| 4,206,583 | A | * | 6/1980 | Week | A01D 41/14 |
| | | | | | 56/15.8 |
| 4,414,793 | A | * | 11/1983 | Halls | A01D 41/14 |
| | | | | | 56/15.8 |
| 4,441,307 | A | * | 4/1984 | Enzmann | A01D 41/14 |
| | | | | | 56/208 |
| 4,473,993 | A | * | 10/1984 | Jennings | A01D 34/28 |
| | | | | | 56/192 |
| 4,573,308 | A | * | 3/1986 | Ehrecke | A01D 41/14 |
| | | | | | 56/15.8 |
| 9,452,512 | B2 | * | 9/2016 | Joyce | B25B 13/481 |
| 2011/0232251 | A1 | * | 9/2011 | Figgins | A01D 41/141 |
| | | | | | 56/17.1 |
| 2019/0014722 | A1 | * | 1/2019 | Farley | A01D 34/02 |

* cited by examiner

FLEX ARM AIR BAG LINKAGE

FIELD OF THE INVENTION

The present invention pertains to an agricultural vehicle and, more specifically, to an agricultural vehicle which has a flexible header.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, and an unloading system, e.g., an unloading auger, on the combine is actuated to transfer the grain into the vehicle.

A typical header for an agricultural vehicle includes one or more cutters, e.g., cutter bars with reciprocating knives, which cut the crop material that is harvested from the field. Once the crop material is cut, a conveyor system, which is positioned rearwardly of the cutter(s), transports the crop material to the feeder housing. Modern headers generally have cutters and attachments which are specifically optimized to harvest a particular kind of crop material. For instance, a draper header is typically used to harvest fluffy or bushy crop material such as soy beans or canola. A draper header generally includes a conveyor that is in the form of one or more flat belts, known as draper belts, to convey the crop material to the feeder housing. Some draper headers are moveably mounted such that the elevation, roll, and/or pitch of the header may be adjusted, allowing the header to more aggressively harvest crop material. Specifically in regards to a flexible cutter bar, a draper header may raise and/or lower the position of the cutter bar, thereby moving the cutter bar up and down at various points along the length of the cutter bar. For example, in the case of an undulating field, a header may continually alter the angle of its cutter bar(s) at various points in order to harvest crop material which otherwise would have been left on the field.

Some headers with flexible cutter bars incorporate a torsion block system in order to control the tension on the cutter bars. A torsion block system may include one or more rubber torsion block(s) and torsion arms. Such systems may provide sufficient tension throughout the range of motion of the cutter bars. However, since a torsion block generally has a sloped spring rate, it will unwind and loose some of its force as the arm travels upward. Due to disparate loadings on various sections of the cutter bar(s), a torsion block system may inadequately lift the cutter bar. For example, if the flexible header is equipped with a center knife drive, which increases the weight acting on the center of the cutter bar, a torsion block system may sufficiently lift the outer sections of the cutter bar but fail to sufficiently lift the center. Thus, instead of having a cutter bar which properly floats up and over the undulations in the terrain, the inadequate lifting of the center may cause the crop or dirt to build up in front of the cutter bar.

What is needed in the art is a flexible header which provides a consistent and sufficient lift force to adjust the cutter bar.

SUMMARY OF THE INVENTION

In one exemplary embodiment provided in accordance with the present invention, a flexible header includes an adjustment system that has a linkage assembly and an air spring which are configured for adjusting a position of the flexible cutter bar.

In another exemplary embodiment provided in accordance with the present invention, a flexible header for an agricultural vehicle includes a frame, at least one cutter bar movably coupled to the frame, and an adjustment system coupled to the frame and the at least one cutter bar. The adjustment system is configured to adjust a position of the at least one cutter bar. The adjustment system includes at least one linkage assembly. The linkage assembly includes a first link member and a second link member. The first and second link members are rotationally coupled to the frame. The adjustment system also includes at least one fluid spring coupled to the first link member and the second link member such that the at least one linkage assembly translates a substantially linear movement of the at least one fluid spring to adjust the at least one cutter bar.

In yet another exemplary embodiment provided in accordance with the present invention a method for adjusting a flexible cutter bar of a header having a frame is provided. The method includes the steps of providing an adjustment system which is coupled to the frame and the flexible cutter bar. The adjustment system is configured to adjust a position of the flexible cutter bar. The adjustment system includes at least one linkage assembly that has a first link member and a second link member. The first and second link members are rotationally coupled to the frame. The adjustment system also includes at least one fluid spring coupled to the first link member and the second link member such that the at least one linkage assembly translates a substantially linear movement of the at least one fluid spring to adjust the flexible cutter bar. The method includes the further steps of preloading the adjustment system to bias a position of the flexible cutter bar, and adding or subtracting a fluid from the at least one fluid spring to adjust the flexible cutter bar.

An advantage of the present invention is that a substantially constant and/or variable spring rate may be applied by the adjustment system to alter the position of the cutter bar.

Another advantage of the present invention is that the fluid spring of the adjustment system provides a substantially linear profile with a nominal drop off in torque throughout extension of the fluid spring.

Yet another advantage of the present invention is that the force acting on the cutter bar may be altered without needing to change a specific part such as a conventional metal or rubber spring which provides a set force.

Still yet another advantage of the present invention is that the adjustment system provides the cutter bar with a certain ground pressure which is generally light and allows the cutter bar to float and follow the undulations of the ground.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
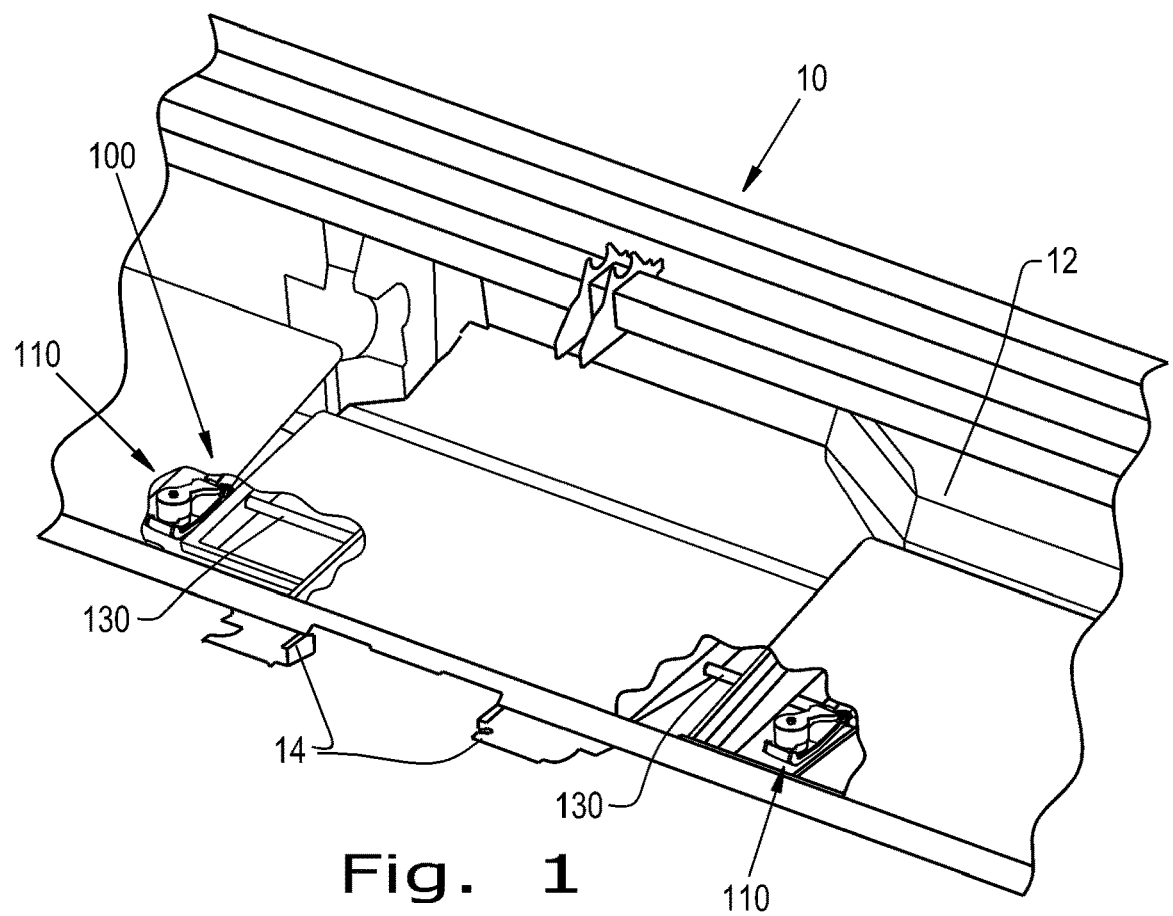
FIG. 1 illustrates a perspective view of an exemplary embodiment of a flexible header with an adjustment system which includes a linkage assembly and an air spring, in accordance with an exemplary embodiment of the present invention.

Referring now to the drawings, and more particularly, to FIGS. 1-6, there is shown a header 10 of an agricultural vehicle that includes an adjustment system 100 that can adjust a position of one or more flexible cutter bar(s). Typically, the flexible header 10 will include additional systems for the cutting and collecting of crop material, but these additional systems are omitted from view for brevity of description. For example, as in the present embodiment, the header 10 may be in the form of a flexible draper header which is supported by a combine harvester and has a cutter bar, draper belts, and a rotating reel. It should be appreciated that the header 10 described and illustrated herein does not necessarily need to be included on combine harvesters, but may also be incorporated in other agricultural vehicles such as windrowers.

Figure 2:
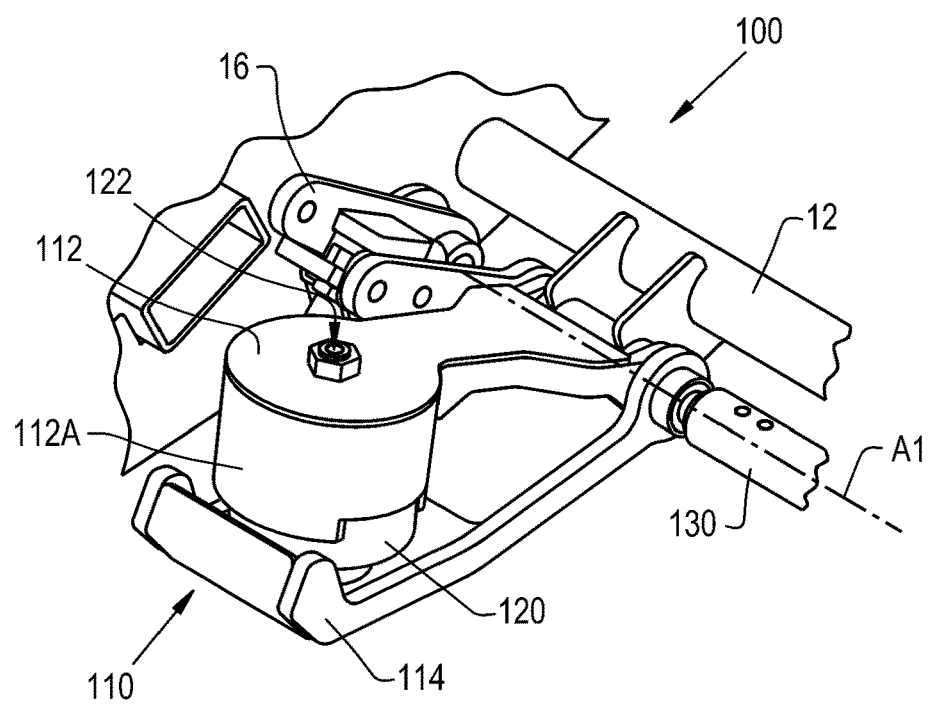
FIG. 2 illustrates a perspective view of the adjustment system of FIG. 1, in accordance with an exemplary embodiment of the present invention.
Figure 3:
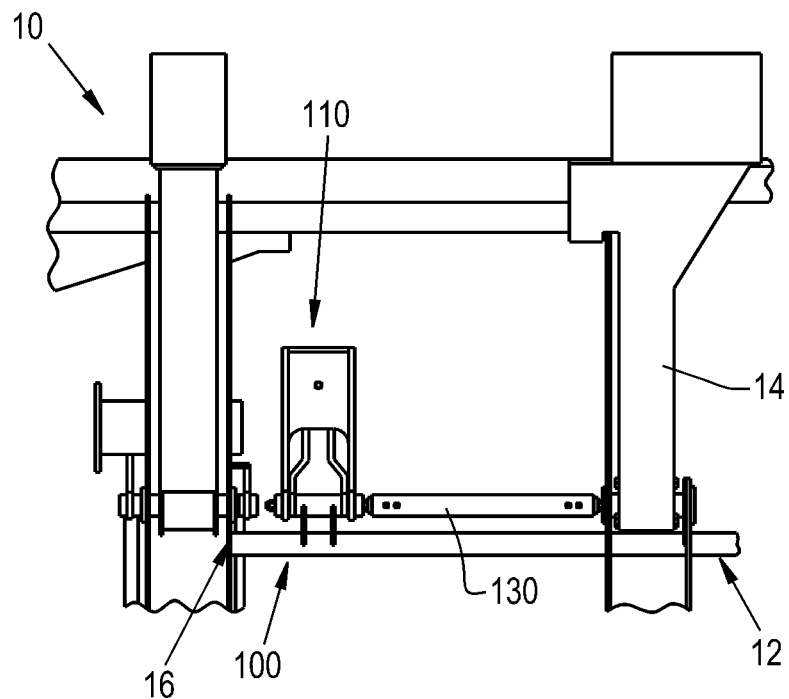
FIG. 3 illustrates a bottom view of the flexible header of FIG. 1, in accordance with an exemplary embodiment of the present invention.
Figure 4:
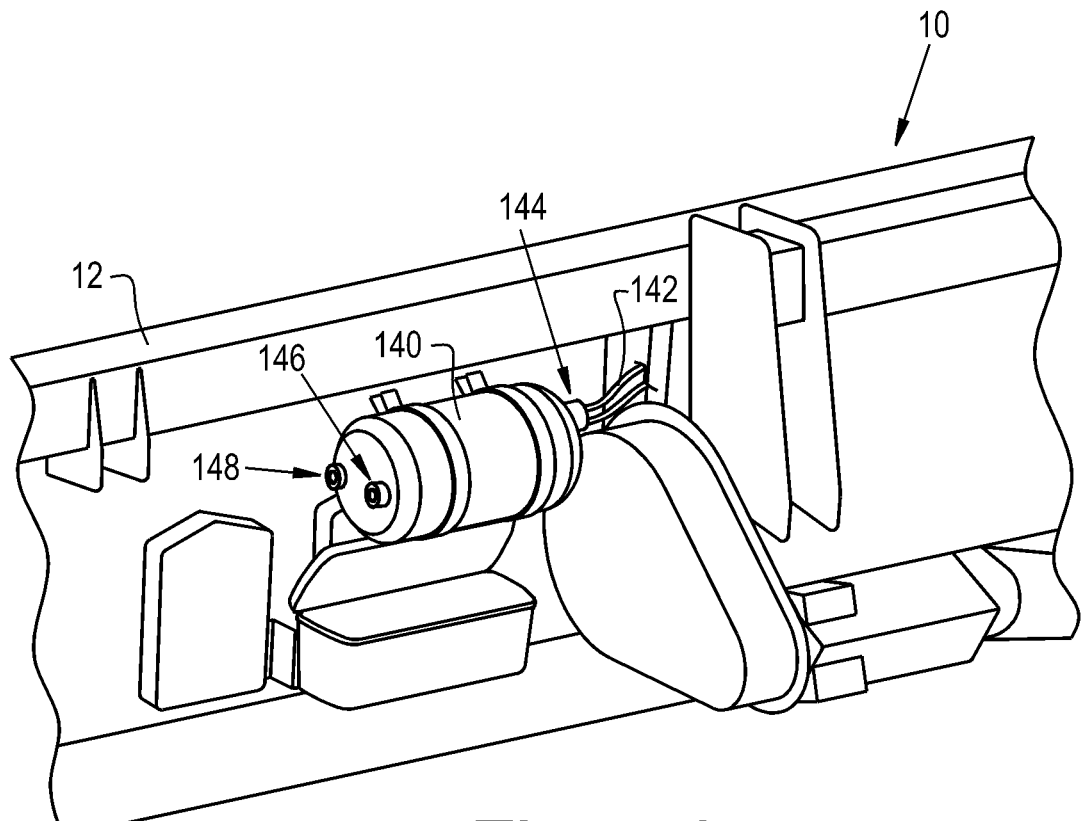
FIG. 4 illustrates a rear perspective view of the flexible header of FIG. 1, in accordance with an exemplary embodiment of the present invention.

The adjustment system 100 may include a linkage assembly 110, a fluid spring 120, a rod 130, and a fluid tank 140 (FIGS. 2 and 4). The adjustment system 100 may be coupled to the frame 12, e.g. a support rod, of the header 10, as well as to the cutter bar of the header 10 via the rod 130. The adjustment system 100 may be located on the underside of the frame 12 of the header 10 (FIG. 3). The adjustment system 100 may include multiple linkage assemblies 110, fluid springs 120, and rods 130 for coupling to each support arm 14 of the cutter bar. Thereby, the adjustment system 100 may selectively adjust the support arms 14, independently or collectively, to adjust a position of a particular section of the cutter bar. The adjustment system 100 provides a desired force profile to the at least one cutter bar. For instance, the adjustment system 100 may provide a custom force profile in order to adjust the cutter bar. The custom force profile may be a constant force profile, or alternatively the custom force profile may be a selectively variable force profile, which adjusts the flexible cutter bar. Further, the adjustment system 100 may provide a higher force as the fluid spring 120 extends. In this regard, a target down pressure may be provided for the cutter bar such that the custom force profile allows the cutter bar to float and follow the undulations of the terrain. Hence, the adjustment system 100 may provide a constant force profile in order to adjust a position of the cutter bar as the cutter bar floats over the terrain. It should be appreciated that the adjustment system 100 may include a controller which is operably coupled to the agricultural vehicle and/or one or more of the components of the adjustment system may be operably coupled to an existing controller of the header and/or agricultural vehicle.

Figure 5:
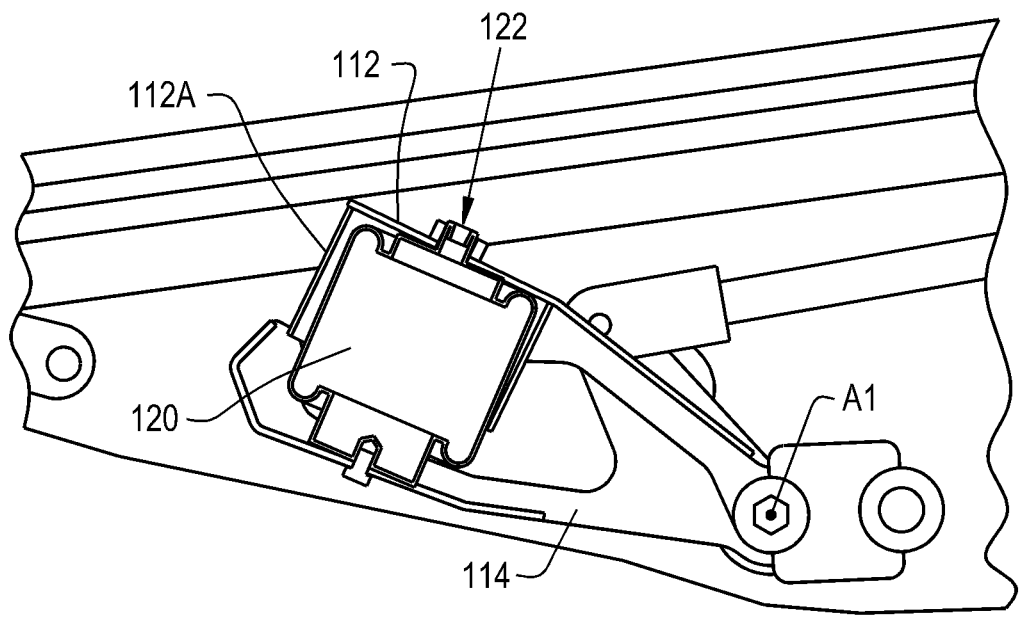
FIG. 5 illustrates a side view of the adjustment system of FIG. 1 with the air spring expanded, in accordance with an exemplary embodiment of the present invention.
Figure 6:
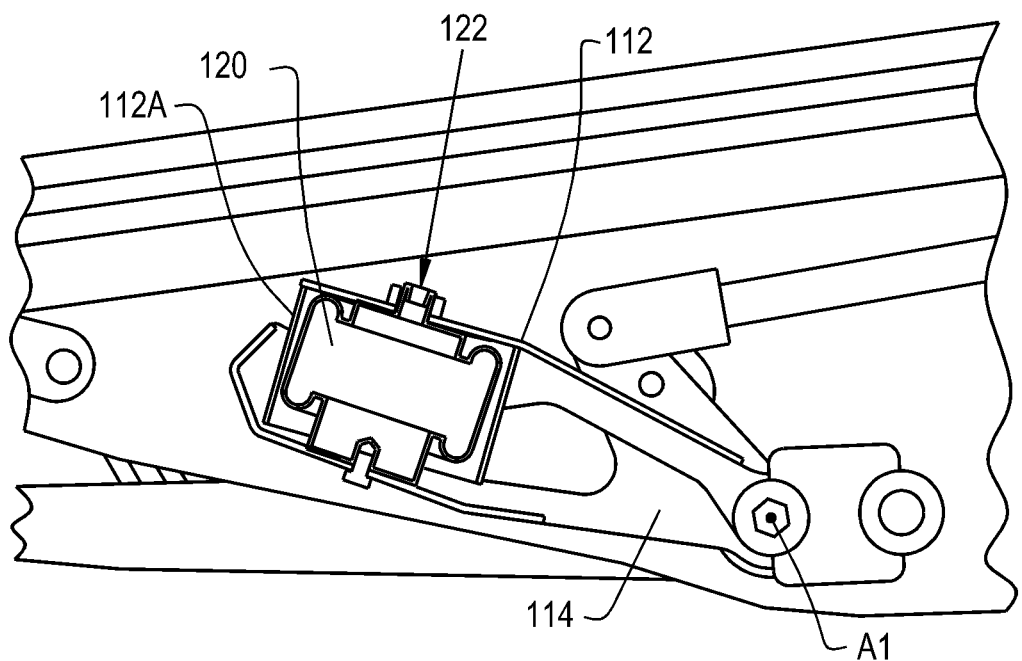
FIG. 6 illustrates a side view of the adjustment system of FIG. 1 with the air spring compressed, in accordance with an exemplary embodiment of the present invention.

The linkage assembly 110 may include a top link member 112 and a bottom link member 114. Both of the link members 112, 114 may be rotationally coupled to the frame 12 of the header 10 at their respective pivoting end. The linkage assembly 110 may be in the form of a scissor linkage assembly 110 in which the link members 112, 114 share a common rotational axis A1 and extend outwardly from the axis A1 (FIGS. 2 and 5-6). In this regard, the movement of the link members 112, 114 may be similar to the movement of a scissor-type motion in that the link members 112, 114 move closer or farther apart from one another as they rotate about the axis A1. The link members 112, 114 may be composed of any desired material, such as metal or plastic.

The top link member 112 may be coupled to the frame 12 and the rod 130. Thereby, the top link member 112 may move with the rod 130 in order to translate rotational movement to the rod 130. The top link member 112 may be pivotally attached to the frame 12 such that the top link member 112 is rotatable relative to the frame 12. The top link member 112 may be rigidly coupled to the rod 130. The top link member 112 may be in the form of an elongated arm member. The top link member 112 may include a protective shield portion 112A which at least partially houses the fluid spring 120. The protective shield portion 112A may be in the form of an annular sleeve that extends downwardly from the top of the top link member 112. The protective shield portion 112A may constrict the movement of the fluid spring 120 such that the fluid spring 120 cannot be depressed to a lower height (FIG. 6). In this regard, the diameter of the protective shield portion 112A may set a minimum height for the fluid spring 120. Additionally, the protective shield portion 112A can limit the travel of the cutter bar, which thereby acts as a down-stop.

The bottom link member 114 may be coupled to the frame 12 and also to an adjustment rod 16 of the header 10 (FIG. 2). The adjustment rod 16 may effectuate movement onto the bottom link member 114. Hence, the bottom link member 114 apply an initial force onto the cutter bar, e.g. the float on the cutter bar, via the adjustment rod 16 so that the cutter bar may initially be moved to a desired position. The bottom link member 114 may be in the form of a skid plate 114 such that it protects the fluid spring 120 and/or the top link member 112. The skid plate 114 may extend beyond the top link member 112, and may have an end portion that extends upwardly to protect the front of the top link member 112 and fluid spring 120.

The fluid spring 120 may be coupled to and in between the top and bottom link members 112, 114. The fluid spring 120 may be coupled to the link members 112, 114 by known fasteners. Since the fluid spring 120 is located in between the link members 112, 114 at a distance from the rotational axis A1, the cross section of the link members 112, 114 and the fluid spring 120 may be triangular in shape (FIGS. 5-6). The fluid spring 120 may include an inlet port 122. The fluid spring 120 actuates up and down along a substantially linear path. This substantially linear movement by the fluid spring 120 is translated by the linkage assembly 110 to adjust the cutter bar. It should be appreciated that a substantially linear movement may include a substantially linear path which is substantially vertical within ±30 degrees. The fluid spring 120 may be in the form of an air spring, e.g. an air bag 120. The air spring 120 may be composed of any semi-deformable material such as plastic, rubber, etc.

The rod 130 rotates about the rotational axis A1 and is coupled to the linkage assembly 110 at one end and to the support arm 14 of the cutter bar at the other end. Since the rod 130 is coupled to the linkage assembly 110, the link members 112, 114 translate the linear movement of the fluid spring 120 into rotational movement which in turn rotates the rod 130. The rotational movement of the rod 130 then adjusts the position of the support arms 14 of the cutter bar, which then ultimately raises or lowers the position of the cutter bar. The rod 130 may be composed of any desired material, such as metal or plastic.

The fluid tank 140 may be fluidly connected to the fluid spring(s) 120 via one or more hose(s) 142. The fluid tank 140 may be coupled to backside of the frame 12 of the header 10 in a known manner (FIG. 4). The fluid tank 140 may have an outlet port 144, a fill port 146, and a pressurized gauge port 148. The fluid tank 140 may be in the form of a pressurized fluid tank, for example, the fluid tank 140 may be in the form of an air tank 140. The fluid tank 140 may also be in the form of an air compressor. It is conceivable to include more than one fluid tank 140, for example two or more fluid tanks, in order to provide pressurized air to the air springs 120. It is also conceivable to not include a fluid tank 140 such that each fluid spring 120 is individually filled with a certain amount of fluid.

It should be appreciated that each fluid spring 120 may be passively or dynamically controlled. In the present embodiment, each fluid spring 120 is passively controlled in that each fluid spring 120 represents a closed system where fluid is not added or subtracted from the fluid spring 120. Rather, the fluid is compressible such that the fluid spring 120 is contracted and expanded. For the passively controlled system, the change in pressure may be minimized as the cutter bar follows the ground. In this regard, the cutter bar may float and follow the undulations of the ground. In the case of a dynamically controlled system, fluid may be added or subtracted from the fluid spring 120 in order to maintain a constant pressure.

Figure 7:
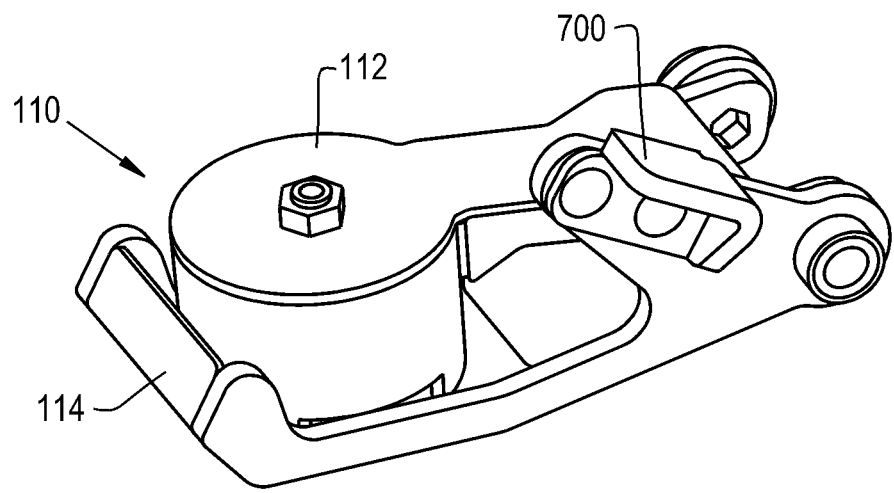
FIG. 7 illustrates the linkage assembly of the adjustment system of FIG. 1 configured for in-cab adjustment of the float of the flexible header, in accordance with an exemplary embodiment of the present invention.
Figure 8:
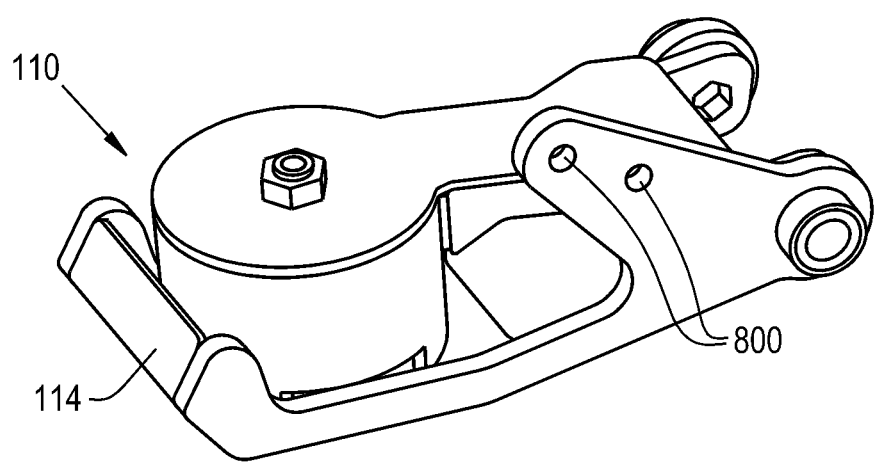
FIG. 8 illustrates the linkage assembly of the adjustment system of FIG. 1 configured for mechanical adjustment of the float of the flexible header, in accordance with an exemplary embodiment of the present invention.

Referring now to FIGS. 7-8, there is shown the linkage assembly 110 in two configurations for either in-cab adjustments (FIG. 7) or manual adjustments (FIG. 8). FIG. 7 shows the bottom link member 114 connected to a bracket 700 which may then be operably coupled to a controller of the agricultural vehicle so that an operator may make in-cab adjustments of the float of the cutter bar in a known matter. The bracket 700 may be bolted to a protruding section of the bottom link 114. FIG. 8 shows the bottom link member 114 with a protruding section that has one or more receiving holes 800 which may couple to a mechanical link in a known manner. Thereby, an operator may manually adjust the float of the cutter bar.

Figure 9:
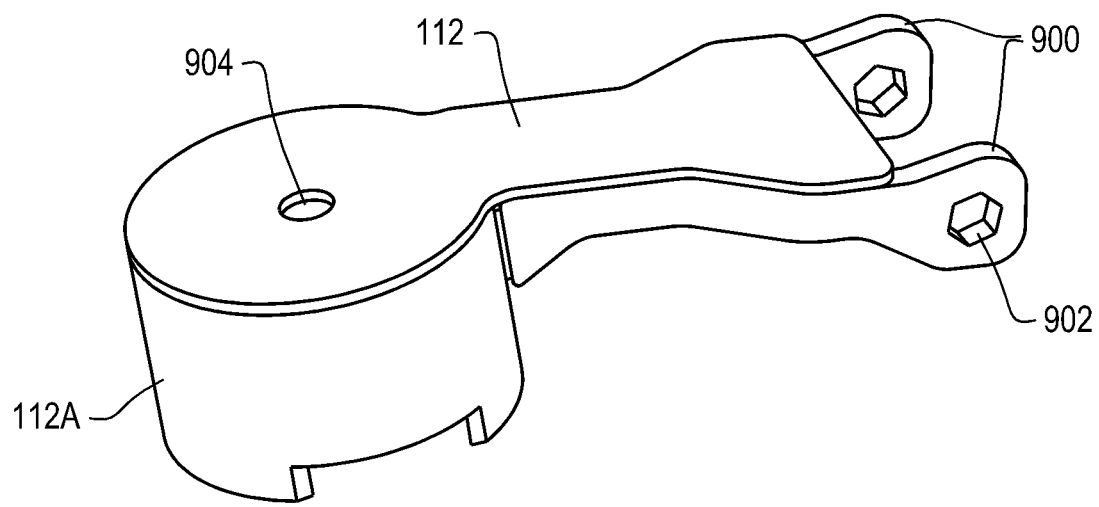
FIG. 9 illustrates the first link member of the linkage assembly of the adjustment system of FIG. 1, in accordance with an exemplary embodiment of the present invention.
Figure 10:
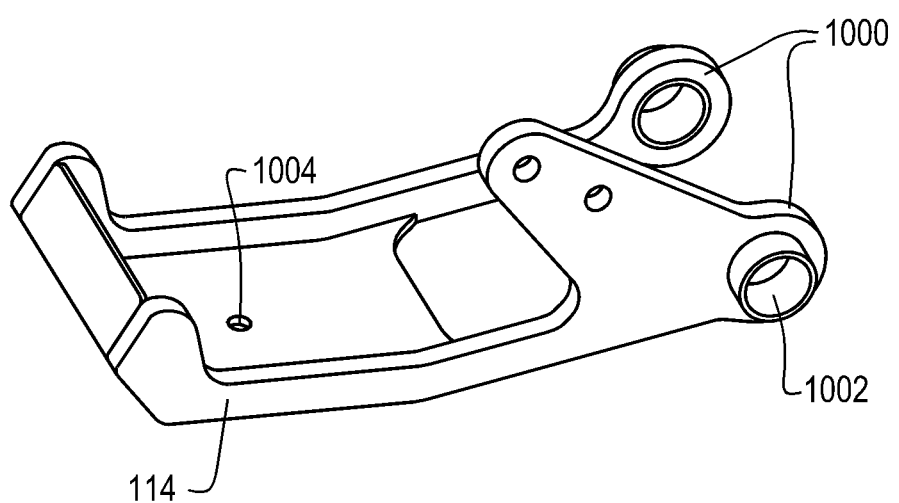
FIG. 10 illustrates the second link member of the linkage assembly of the adjustment system of FIG. 1, in accordance with an exemplary embodiment of the present invention.

Referring now to FIGS. 9-10, there is shown the top link member 112 (FIG. 9) and the bottom link member 114 (FIG. 10) in more detail. The link members 112, 114 may each have a pair of elongate sections 900, 1000 which have respective receiving holes 902, 1002 for coupling to the frame 12. The elongate sections 900 of the top link member 112 may be separated by a shorter distance than the elongate sections 1000 of the bottom link member 114 such that at least a portion of the elongate sections 900 of the top link 112 fit within and/or abut against the inner surface of the elongate sections 1000 of the bottom link member 114. The respective holes 902, 1002 of the link members 112, 114 may be of any desired shape. For example, the holes 902 may have a hexagonal cross-section, and the holes 1002 may have a circular cross-section. The holes 902 may directly couple to an end of the rod 130 which is correspondingly-shaped to fit within one or both of the holes 902. Alternatively or additionally, a pin may be inserted in the receiving holes 902 in order to couple the linkage assembly 110 to the frame 12 and the rod 130. The link members 112, 114 may also each include a respective receiving hole 904, 1004 which are configured for receiving and securing the fluid spring 120. For instance, the hole 904 may receive the inlet port 122 of the fluid spring 120.

Figure 11:
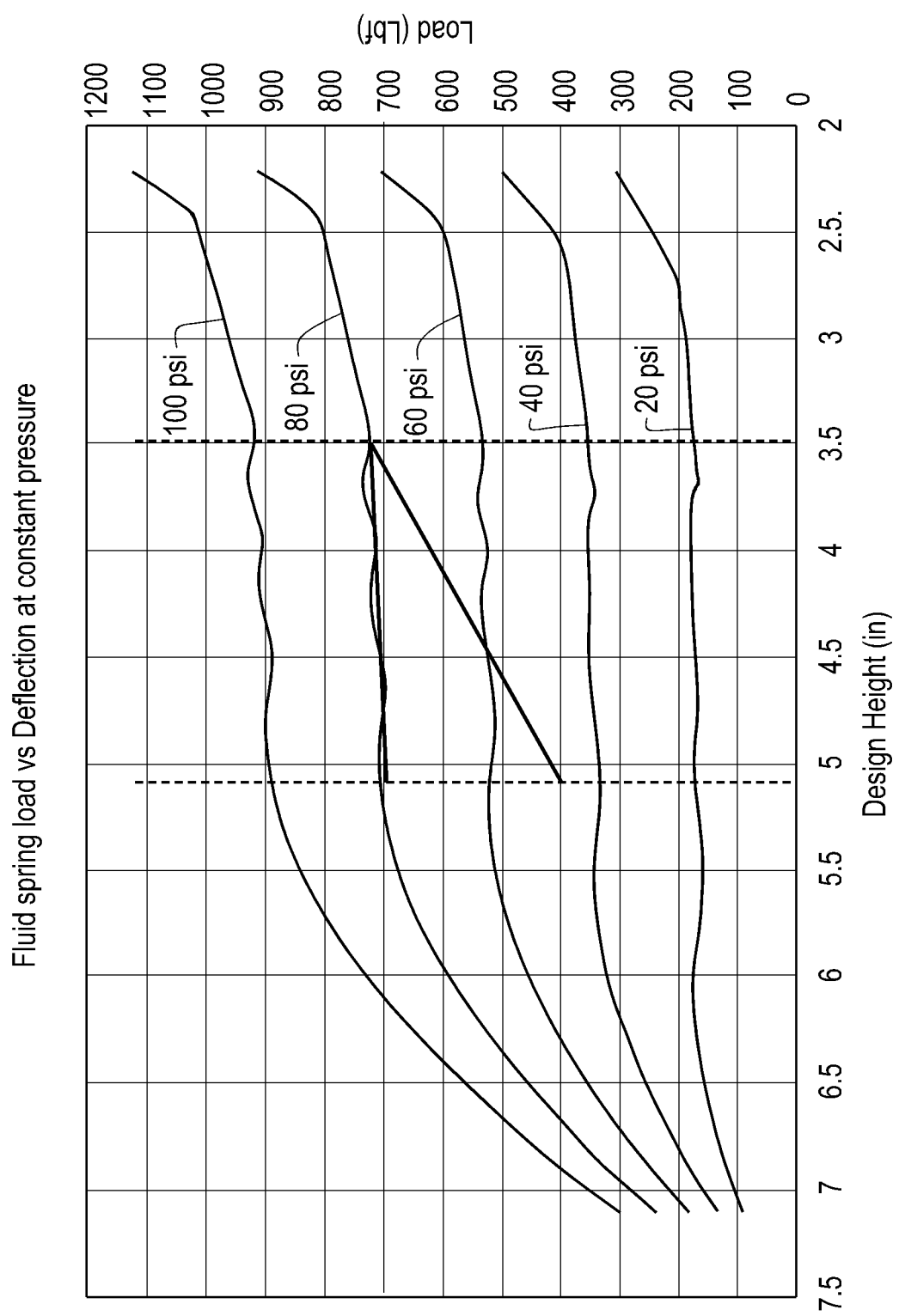
FIG. 11 illustrates a graphical representation of the behavior of the adjustment assembly, in accordance with an exemplary embodiment of the present invention.

Referring now to FIG. 11, there is shown a graphical representation of the fluid spring curve 120. FIG. 11 shows that within a range of a design height of the fluid spring 120, the fluid spring 120 may provide a substantially constant force as the fluid spring 120 extends and retracts. With some prior art systems, there may be a fairly significant drop off in force, such as with a torsion block system which may vary up to 18% as the spring unwinds (as shown by the diagonal reference line in FIG. 11). However, the adjustment system 100 may only experience a negligible drop off in force. For example, the fluid spring 120 may only drop off in force approximately 3% as it extends and retracts. Thereby, the adjustment system 100 may provide a substantially constant force throughout a range of pressures and loadings. For example, the air spring 120 of the present exemplary embodiment may provide a constant force at a design range of 3.5 to 5.1 inches for a constant air pressure. The air tank provides an approximation of the constant pressure.

In operation, an operator may initially preload the adjustment system 100 to bias a position, e.g. the float, of the flexible cutter bar. The operator may conduct in-cab or manual adjustments which rotate the bottom link member 114. In turn, the flexible cutter bar will have an initial loading which biases an initial position of the cutter bar from which the cutter bar will float and/or from which further adjustments may be conducted. The operator may also conduct further adjustments of the cutter bar from within the cab of the agricultural vehicle by either adding or subtracting a fluid from the fluid spring(s) 120. For example, a greater amount of fluid may be added to the fluid spring 120 in order to rotate the rod 130 and raise the position of the support arm 14 of the cutter bar.

Figure 12:
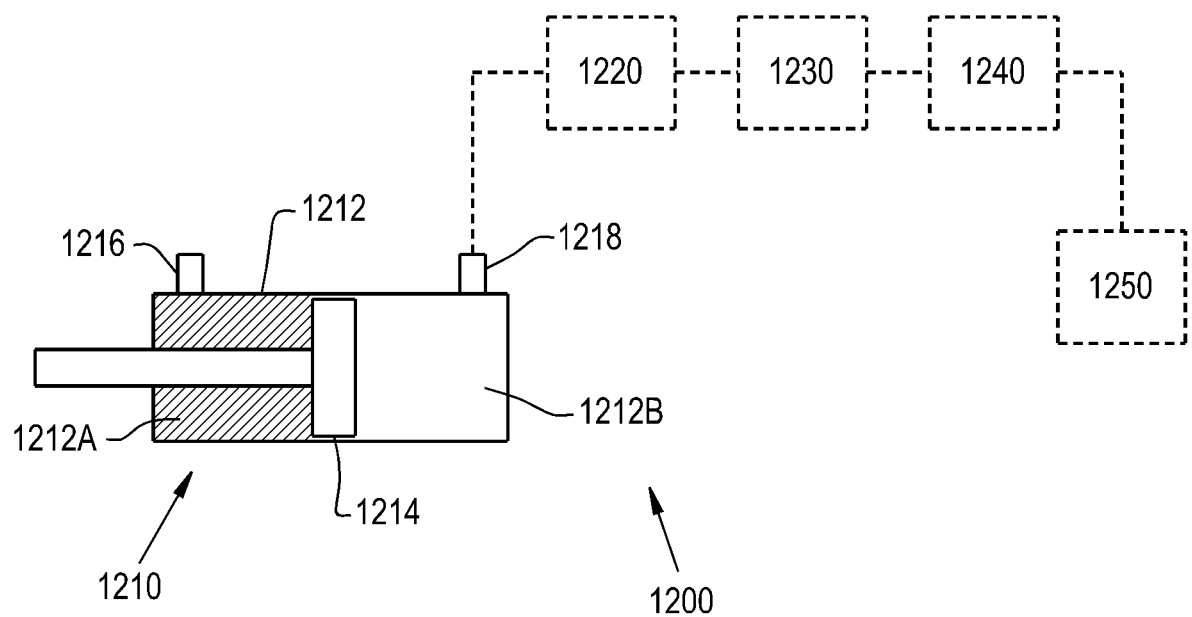
FIG. 12 illustrates a schematic view of another exemplary embodiment of an adjustment system which includes a hydraulic adjuster, a linkage assembly, and an air spring, in accordance with an exemplary embodiment of the present invention.

Referring now to FIG. 12, there is shown another exemplary embodiment of the adjustment system 1200 which generally includes a hydraulic adjuster 1210, a fluid spring 1220, a linkage assembly 1230, and a rod 1240 that is operably coupled to the cutter bar 1250 via a support arm. The fluid spring 1220, the linkage assembly 1230, and the rod 1240 of the adjustment system 1200 may be designed as or substantially similar to the fluid spring 120, the linkage assembly 110, and the rod 130 of the adjustment system 100, respectively.

The hydraulic adjuster 1210 is configured to adjust the fluid spring 1220 and thereby the cutter bar 1250. The hydraulic adjuster 1210 may include a hydraulic cylinder 1212 and a piston 1214. The hydraulic cylinder 1212 may have an inlet port 1216 which is fluidly connected to the hydraulic oil of the agricultural vehicle and an outlet port 1218 that is fluidly connected to the fluid spring 1220. The hydraulic cylinder 1212 may be partitioned into two chambers 1212A, 1212B by way of the piston 1214. The chambers 1212A, 1212B may be respectively associated with the inlet port 1216 and the outlet port 1218, and thereby the chamber 1212A may be filled with a hydraulic fluid such as hydraulic oil and the chamber 1212B may be filled with a fluid such as air. Therefore, as the piston 1214 actuates via adding or subtracting hydraulic oil, the air volume and thus air pressure is altered to adjust the position of the cutter bar 1250. For example, if hydraulic oil is added to the chamber 1212A of cylinder 1212, the piston 1214 moves to the right and the volume for air in the chamber 1212B of cylinder 1212 is reduced. Thereby, as the air volume is decreased, the air pressure is then increased in the fluid spring 1220, which then in turn changes the position of the cutter bar 1250.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A flexible header for an agricultural vehicle, comprising:
    a frame;
    at least one cutter bar movably coupled to the frame; and
    an adjustment system coupled to said frame and said at least one cutter bar, and configured to adjust a position of said at least one cutter bar, said adjustment system including:
        at least one linkage assembly including a first link member and a second link member, each said first link member and second link member being rotationally coupled to said frame; and
        at least one fluid spring coupled to said first link member and said second link member such that said at least one linkage assembly translates a substantially linear movement of said at least one fluid spring to adjust said at least one cutter bar, said adjustment system provides a constant force profile including a substantially constant force throughout a range of pressures and loadings in the at least one fluid spring.

2. The flexible header of claim 1, wherein said constant force profile said at least one cutter bar as said at least one cutter bar floats over a terrain, the constant force profile being in a range of 3.5 to 5.1 inches of deflection for a constant air pressure.

3. The flexible header of claim 1, wherein said at least one linkage assembly is in the form of at least one scissor linkage assembly in which said first link member and said second link member share a common rotational axis.

4. The flexible header of claim 3, wherein said first and second link members extend outwardly from said common rotational axis and said at least one fluid spring is located in between said first and second link members at a distance from said common rotational axis such that a cross section of said link members and said at least one fluid spring is triangular in shape.

5. The flexible header of claim 3, wherein said adjustment system further includes at least one rod connected to said at least one linkage assembly at a first end and connected to said at least one cutter bar at a second end.

6. The flexible header of claim 5, wherein said at least one rod rotates about said common rotational axis of said first and second link members.

7. The flexible header of claim 6, wherein said at least one scissor linkage assembly translates said substantially linear movement of said at least one fluid spring into a rotational movement to rotate said at least one rod in order to adjust said at least one cutter bar.

8. The flexible header of claim 1, wherein said first link member has a protective shield portion which at least partially houses said at least one fluid spring.

9. The flexible header of claim 8, wherein said protective shield portion of said first link member sets a minimum height for said at least one fluid spring.

10. The flexible header of claim 1, wherein said second link member is in the form of a skid plate which is located below said first link member and is configured to protect said at least one fluid spring.

11. The flexible header of claim 1, wherein said adjustment system further includes a fluid tank which is fluidly connected to said at least one fluid spring.

12. The flexible header of claim 11, wherein said at least one fluid spring is in the form of an air bag and said fluid tank is in the form of an air tank.

13. A method for adjusting a flexible cutter bar of a header having a frame, comprising the steps of:
    providing an adjustment system coupled to the frame and the flexible cutter bar, and configured to adjust a position of the flexible cutter bar, said adjustment system including at least one linkage assembly including a first link member and a second link member, each said first link member and second link member being rotationally coupled to the frame, and at least one fluid spring coupled to said first link member and said second link member such that said at least one linkage assembly translates a substantially linear movement of said at least one fluid spring to adjust the flexible cutter bar;
    preloading said adjustment system to bias a position of the flexible cutter bar; and
    adding or subtracting a fluid from said at least one fluid spring to adjust said flexible cutter bar, said adjustment system providing a constant force profile including a substantially constant force throughout a range of pressures and loadings in the at least one fluid spring.

14. The method of claim 13, wherein said constant force profile adjusts said at least one cutter bar as said at least one cutter bar floats over a terrain, the constant force being in a range of 3.5 to 5.1 inches of deflection for a constant air pressure.

15. The method of claim 13, wherein said at least one linkage assembly is in the form of at least one scissor linkage assembly in which said first link member and said second link member share a common rotational axis.

16. The method of claim 15, wherein said first and second link members extend outwardly from said common rotational axis and said at least one fluid spring is located in between said first and second link members at a distance from said common rotational axis such that a cross section of said link members and said at least one fluid spring is triangular in shape.

17. The method of claim 15, wherein said adjustment system further includes at least one rod connected to said at least one linkage assembly at a first end and connected to said flexible cutter bar at a second end.

18. The method of claim 17, wherein said at least one rod rotates about said common rotational axis of said first and second link members.

19. The method of claim 18, wherein said at least one scissor linkage assembly translates said substantially linear movement of said at least one fluid spring into a rotational movement to rotate said at least one rod in order to adjust said flexible cutter bar.

20. The method of claim 13, wherein said first link member has a protective shield portion which at least partially houses said at least one fluid spring.

* * * * *